United States Patent [19]

Jakeway

[11] Patent Number: 4,475,302
[45] Date of Patent: Oct. 9, 1984

[54] SPOON LURE

[76] Inventor: Robert W. Jakeway, P.O. Box 955, Colstrip, Mont. 59323

[21] Appl. No.: 428,197

[22] Filed: Sep. 29, 1982

[51] Int. Cl.³ ............................................. A01K 85/00
[52] U.S. Cl. ................................................... 43/42.5
[58] Field of Search .................... 43/42.5, 42.32, 42.33

[56] References Cited

U.S. PATENT DOCUMENTS

| D. 228,553 | 10/1973 | Sanderson | 43/42.5 |
|---|---|---|---|
| 916,691 | 3/1909 | Fey | 43/42.5 |
| 1,742,934 | 1/1930 | Richardson | 43/42.5 |
| 1,770,003 | 7/1930 | Miller | 43/42.5 |
| 1,924,350 | 8/1933 | Cordell | 43/42.5 |
| 2,476,388 | 7/1949 | Schafer | 43/42.5 |
| 3,145,497 | 8/1964 | Aho | 43/42.5 |
| 3,210,882 | 10/1965 | Purdom | 43/42.33 |
| 3,935,659 | 2/1976 | McCallum | 43/42.32 |

FOREIGN PATENT DOCUMENTS 180891  11/1935  Switzerland ..................... 43/42.5

Primary Examiner—Nicholas P. Godici
Assistant Examiner—Marc Hodak
Attorney, Agent, or Firm—Arthur L. Urban

[57] ABSTRACT

A fishing lure including an elongated body member, the body member being formed from a substantially flat metal strip and having a length between about two and five times the width, a longitudinal axis with a generally two step configuration, a transverse bend in one direction along at least one-third of its length and a transverse bend in an opposite direction along at least a significant portion of the remainder of its length, a fluorescent surface on one side thereof and a dark surface on the opposite side thereof, a line fastener located adjacent one end of the body member, and a hook fastener located adjacent the opposite end of the body member.

9 Claims, 5 Drawing Figures

SPOON LURE

This invention relates to a novel fishing device and more particularly relates to a new fishing lure.

Throughout the centuries, fishermen have had their favorite methods of catching fish. Some of these methods are simply figments of the fisherman's imagination while others are of some substance. Some even border on superstition. Among the fishing methods which fishermen favor are special fishing spots, fishing at certain times of day and different types of fishing equipment.

The particular fishing spot to a large extent determines the general type of equipment and baits employed. For example, mountain stream fishing generally is done with fly fishing equipment and tied flies as bait. On the other hand, fishing in larger bodies of water ordinarily involves casting, trolling and the like. The latter type of fishing utilizes both natural and artificial baits.

While the types of fishing may be fairly clearly defined, the selection of equipment and baits within each type can vary widely. This enables a fisherman to consider the variables which he will encounter in his specific fishing situation and make a selection based on his previous experience or his intuition.

In view of the strong interest by fishermen in selecting their equipment, a great variety of fishing equipment and baits is offered. Equipment which proves to be useful and beneficial to fishermen becomes quite popular. On the other hand, much equipment is purchased on a whim and used only a few times before being set aside.

As a result of the fisherman's constant search for equipment which will improve his results, the fishing equipment industry has become a very large business with a great deal of money being spent each year by fishermen. Also, designers of equipment are constantly coming up with new items in order to get a larger proportion of the fisherman's dollars. In spite of the continuous introduction of different products, the market does not become saturated and there still is a continuing demand for new items.

The present invention provides a novel fishing lure. The lure of the invention is attractive to fish. The lure is lower in cost than comparable lures presently available. The lure of the invention has a configuration completely different from other lures. The lure is useful under a variety of fishing conditions.

The fishing lure of the invention is simple in design and can be fabricated relatively inexpensively utilizing present manufacturing techniques. In addition, the lure can be fabricated from commercially available materials and components.

These and other benefits and advantages of the novel fishing lure of the invention will be apparent from the following description and the accompanying drawings in which.

Figure 1:
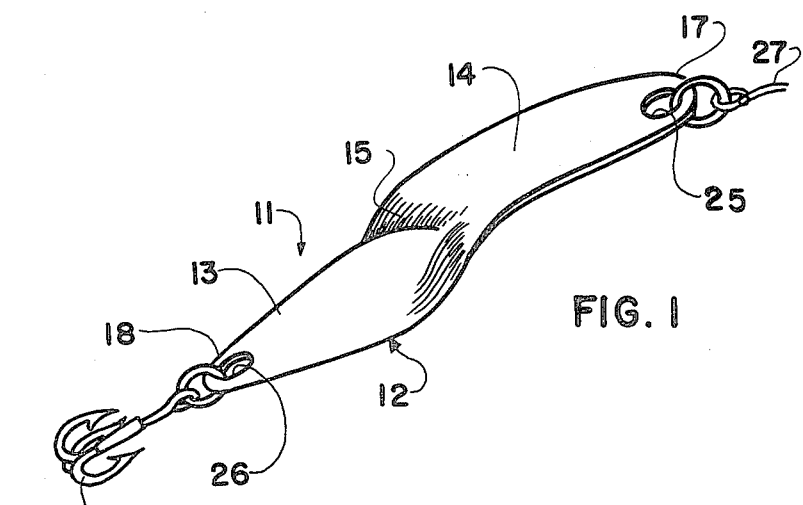
FIG. 1 is a view in perspective of one form of the fishing lure of the invention.
Figure 2:
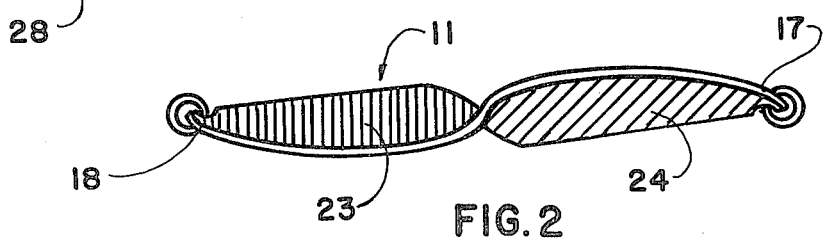
FIG. 2 is a side view of the fishing lure shown in FIG. 1.

As shown in the drawings, one form of the novel fishing lure 11 of the present invention includes an elongated body member 12 with smooth side edges and tapered ends. The body member 12 is formed from a substantially flat metal strip. The body member advantageously is formed of a non-corrosive metal such as brass and the like.

The body member 12 has a length between about two and five times the width thereof. Preferably, the body member has a length between about three and four and one-half times its width.

The body member 12 has a transverse bend 13 in one direction along at least one-third of its length. Also, the body member has a transverse bend 14 in a direction opposite to the first bend along at least a significant portion of the remainder of its length. Advantageously, the body member 12 has a transverse bend in one direction along approximately one-half of its length and a transverse bend in an opposite direction along substantially the remaining half of its length.

Each of the transverse bends 13 and 14 advantageously has a radius along the central part 15 thereof approximately one-forth the width of the body member. Likewise, each of the transverse bends 13 and 14 has a radius adjacent the ends 17 and 18 thereof only slightly smaller than one-half the width of the body member.

Figure 5:
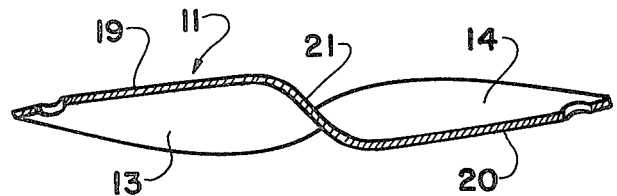
FIG. 5 is a sectional view taken along line 5—5 of FIG. 3.

The body member 12 includes a longitudinal axis that includes two steps. One of each steps follows the central part of each transverse bend. As shown in FIG. 5, the axis section 19 in bend 13 is displaced transversely of the axis section 20 in the bend 14. The adjacent ends of the axis sections 19 and 20 are joined by a sloping axis section 21. Advantageously, the axis sections 19 and 20 are disposed substantially parallel to one another.

The body member 12 includes a fluorescent surface on one side 23 thereof and a dark surface on the opposite side 24 thereof. The fluorescent surface advantageously has a pink color, while the dark surface preferably is brown in color.

Figure 3:
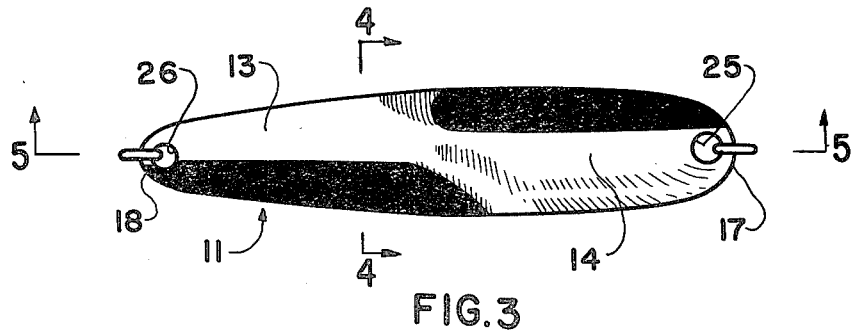
FIG. 3 is a top view of the fishing lure shown in FIGS. 1 and 2.

The body member 12 also includes line fastening means located adjacent one end thereof and hook fastening means located adjacent the opposite end. The line fastening means and the hook fastening means advantageously include openings 25 and 26 respectively disposed adjacent opposite ends of the longitudinal axis of the body member. The body member tapers more severely toward the hook fastening means as shown in FIG. 3.

The ends of the body member 12 preferably include curved edges extending from the longitudinal axis. This provides a streamlined configuration to the body member. The curved edges adjacent the hook fastening means advantageously provide a taper to the sides adjacent thereto. This makes the configuration of the transverse bend portion adjacent to the hook fastening means of smaller size than the bend portion adjacent to the line fastening means.

Figure 4:
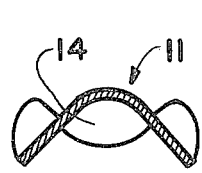
FIG. 4 is a sectional view taken along line 4—4 of FIG. 3.

The formation of the transverse bends 13 and 14 of the body member 12 may be accomplished by bending a portion of the flat metal strip around a rod having a diameter approximately one-half the width of the strip. The strip is bent only partway around the rod, that is, in the central part of the strip as shown in FIG. 4. The bending causes the outer edges of the strip to be drawn toward each other.

After the first transverse bend is formed, the strip is reversed end to end and the opposite side of the strip placed into contact with the rod. Then, the second transverse bend is formed in the same way as the first bend. By spacing the bends slightly from one another along the length of the strip, the sloping section 21 is produced.

Formation of the bends 13 and 14 is facilitated through the use of a combination of a rod with a convex surface such as an arc section of a pipe (not shown). By using a pipe section having a diameter only slightly less than the width of the strip, pressure is applied against the edges of the strip causing it to be bent around the rod at the central part thereof while leaving the outer transverse sections with more shallow curves.

In the use of the fishing lure of the present invention, a line 27 is affixed to the line fastening opening 25 in the end of the body member 12. Likewise, a hook or hooks 28 are affixed to the hook fastening opening 26. The lure now is ready for use. The lure can be used for casting, trolling and similar fishing methods in the same way as known lures.

The above description and the accompanying drawings show that the present invention provides a novel fishing lure which has unique advantages over known lures. The lure is very attractive to fish and thus produces large catches. Also, the fishing lure of the invention is lower in price than comparable lures on the market. The lure has a completely different configuration from other lures. The lure is useful under a wide variety of fishing conditions.

The fishing lure of the invention is simple in design and can be fabricated from commercially available materials and components. Conventional lure manufacturing techniques and produces can be employed in its fabrication. The lure is durable in construction and has a long useful life.

It will be apparent that various modifications can be made in the particular fishing lure described in detail above and shown in the drawings within the scope of the invention. The size, configuration and arrangement of the components can be different to meet specific requirements. For example, the size and weight of the lure may be greater for trolling than would be the case with lures used with spinning tackle. Therefore, the scope of the invention is to be limited only by the following claims.

What is claimed is:

1. A fishing lure including an elongated body member with smooth side edges and tapered ends, said body member being formed from a substantially flat metal strip, said body member having a length between about two and five times the width thereof, line fastening means located adjacent one end of said body member and hook fastening means located adjacent the opposite end of said body member, said body member tapering more severely toward said hook fastening means, said body member having a longitudinal axis with a generally two step configuration, said body member having a transverse bend in one direction extending from said hook fastening means between about one-third and one-half of its length and a transverse bend in an opposite direction along the remainder of its length, each of said transverse bends having a radius of curvature of approximately one-forth the width of said body member, and located only along the central part thereof said body member including a fluorescent surface on one side thereof and a dark surface on the opposite side thereof.

2. A fishing lure according to claim 1 wherein said strip is formed of a non-corrosive metal.

3. A fishing lure according to claim 1 wherein said body member has a length between about three and four and one-half times the width thereof.

4. A fishing lure according to claim 1 wherein said body member has a transverse bend in one direction along approximately one-half of its length and a transverse bend in an opposite direction along substantially the remaining half of its length.

5. A fishing lure according to claim 1 wherein each of said transverse bends has a radius adjacent the ends thereof only slightly smaller than one-half the width of said body member.

6. A fishing lure according to claim 1 wherein said fluorescent surface of said body member has a pink color.

7. A fishing lure according to claim 1 wherein said dark surface of said body member has a brown color.

8. A fishing lure according to claim 1 wherein said line fastening means and said hook fastening means each include an opening disposed along opposite ends of the longitudinal axis of said body member.

9. A fishing lure according to claim 1 wherein the ends of said body member include curved edges extending from adjacent the longitudinal axis thereof.

* * * * *